Patented Sept. 20, 1949

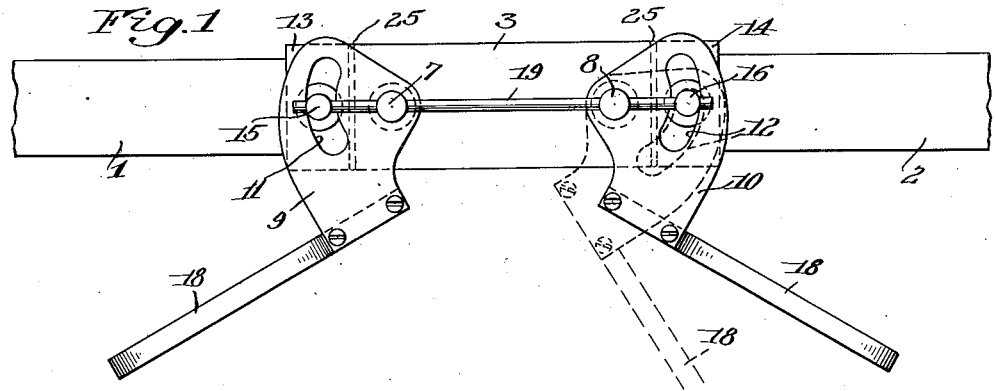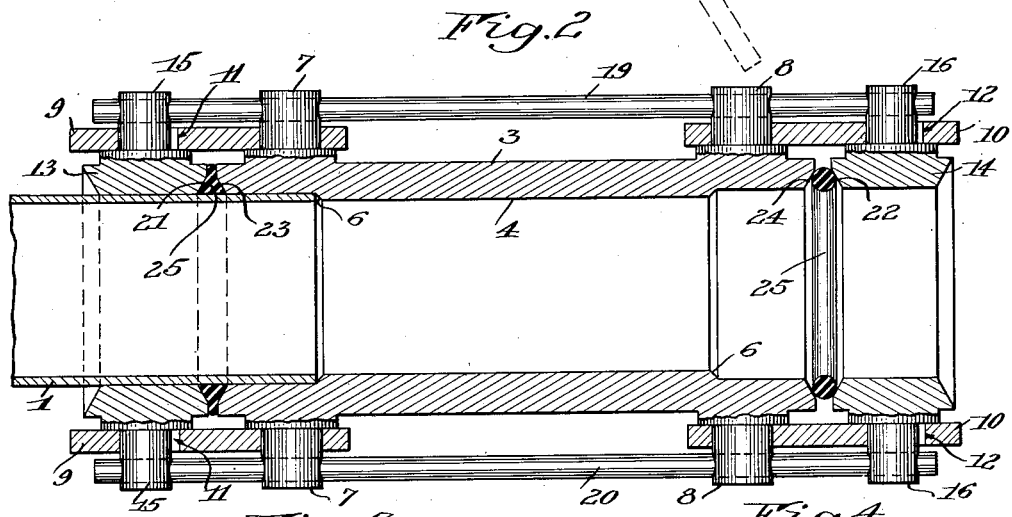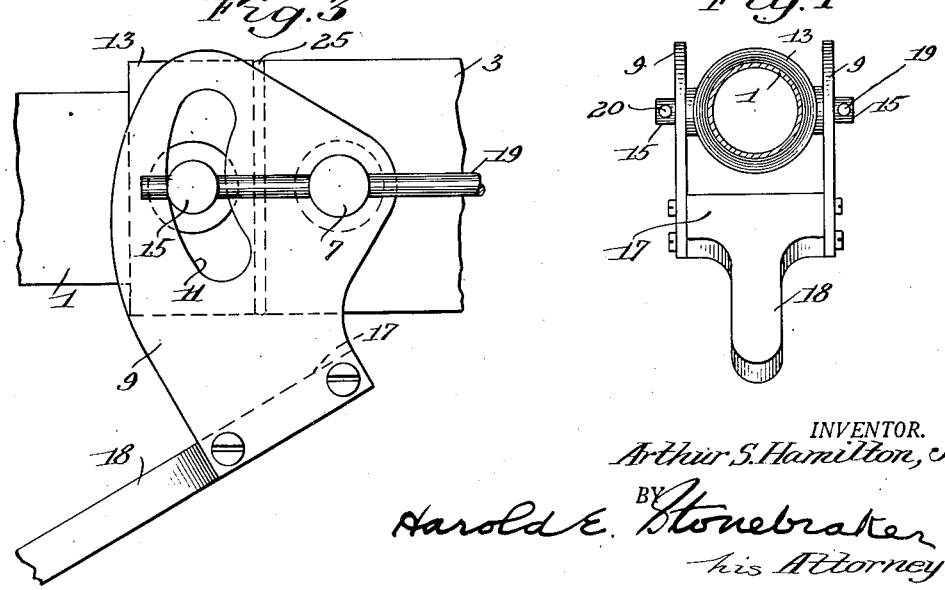

2,482,175

UNITED STATES PATENT OFFICE 2,482,175

DETACHABLE PIPE COUPLING

Arthur S. Hamilton, Jr., Greece, N. Y.

Application July 27, 1945, Serial No. 607,372

5 Claims. (Cl. 285—171)

This invention relates to a quickly detachable pipe coupling, with particular reference to dairies, milk-handling plants, and other equipment requiring frequent cleaning and sterilization, and it has for its purpose to afford a practical and efficient structure which can be readily and quickly attached to or removed from two adjoining pipe sections.

A more particular purpose of the invention is to afford a simple construction having few parts, and which when removed permits quick access to every portion so that the coupling can be thoroughly cleansed.

Another object of the invention is in conjunction with a structure including a central housing and clamping sleeves movable toward and from the ends of the housing, to provide effective operating means that can be readily manipulated to move the clamping sleeves into clamping position and which when in such position securely retain the central housing in liquid-tight relation to the pipe sections.

A further purpose of the invention is to afford a structure in which the clamping sleeves are effectively guided in a straight line during their clamping movement toward the central housing to prevent any unevenness or twisting of the clamping sections in relation to the housing.

Still an additional object of the invention is to provide a construction for connecting two pipe sections which may be either in alinement or offset from each other, and in which the movable clamping sleeves, the guiding instrumentalities for the clamping sleeves, and the operating means are all mounted on the central housing.

Another purpose of the invention is to provide simple and efficient cam operated means which can be easily manipulated to move the sleeve to clamping position and which securely retains the sleeves and housing clamped on the pipes.

To these and other ends, the invention consists in the construction and arrangement of parts that will appear clearly from the following description when read in conjunction with the accompanying drawings, the novel features being pointed out in the claims following the specification.

In the drawings:

Fig. 1 is a view in side elevation showing a preferred embodiment of the invention in clamped position on alined pipe sections, the operating means for one of the clamping sleeves being illustrated in dotted lines in releasing position;

Fig. 2 is a horizontal sectional view taken centrally of Fig. 1, showing one clamping sleeve in clamping position and the other clamping sleeve in releasing position;

Fig. 3 is an enlarged view in side elevation, with parts broken away, showing one end of the device with the clamping sleeve in clamping position, and Fig. 4 is a transverse vertical sectional view taken through one of the compressible gripping rings.

Referring more particularly to the drawings in which like reference numerals refer to the same parts throughout the several views, the structure is designed for coupling together two alined, or other relatively positioned, pipe sections 1 and 2, and includes a central housing 3 having a reduced interior diameter 4 intermediate its ends, and enlarged interior diameters 5 at the ends, affording shoulders 6 against which the pipe sections abut when inserted into the central housing, as illustrated at the left of Fig. 2.

While the central housing is illustrated as cylindrical to cooperate with alined pipe sections, it may take various forms such as a valve housing, a T-housing, or the form of an elbow or right-angled coupling for cooperation with angularly disposed pipe sections, and incorporate the same structural and functional characteristics of the invention, as now to be described.

The central housing 3 preferably supports and carries clamping sleeves, and guiding and operating instrumentalities for the clamping sleeves, and to this end is provided with oppositely arranged trunnions 7 and 8 at its ends, constituting supports for the clamping sleeve operating means and guiding instrumentalities.

The operating means may be constructed in various ways and may consist of cam plates mounted on opposite sides on trunnions 7 and 8 or otherwise, and arranged to control the clamping sleeves, which are supported by guiding instrumentalities also preferably carried by the trunnions 7 and 8.

To effect this, the trunnions 7 and 8 constitute pivotal supports for the parallel cam plates 9 and 10 respectively, mounted as shown, and having cam slots 11 and 12 respectively, that engage the clamping sleeves and control their movements, as will now be described.

The clamping sleeves are designated at 13 and 14 respectively, and provided with pins 15 and 16 respectively, the pins 15 of clamping sleeve 13 engaging the cam slots 11 of the cam plates 9, while the pins 16 of clamping sleeve 14 engage the cam slots 12 of cam plates 10. The cam slots 11 and 12 are of such shape as to effect endwise movement of the clamping sleeves to clamping position when the cam plates are swung on their pivotal supports, and to retain the sleeves in clamping position.

Each pair of cam plates is rigidly connected for convenient manual operation, and to this end the cam plates 9 have located therebetween and rigidly attached thereto a connecting plate 17, see Fig. 4, which is formed with an operating handle 18 by which the cam plate can easily be manipulated to clamping or releasing position.

In order to support and guide the clamping sleeves and insure a uniform even movement of the latter without twisting, the pins 15 and 16 of the clamping sleeves are provided with openings extending therethrough which receive the ends of guide rods 19 and 20, on which the pins 15 and 16 and clamping sleeves are slidable. The guide rods 19 and 20 preferably extend through openings formed in the trunnions 7 and 8 and are rigidly secured thereto as by a drive fit within said openings, or otherwise, and it will be understood that the guide rods may be constructed otherwise than as shown, provided they afford guides rigidly mounted on the central housing and controlling the endwise movements of the clamping sleeves so as to insure a correct and uniform clamping action.

The clamping sleeves 13 and 14 are spaced from the central housing 3, as shown in Fig. 2, and provided at their ends with inwardly inclined or bevelled surfaces 21 and 22 arranged oppositely to correspondingly inclined or bevelled surfaces 23 and 24 at the ends of the central housing, while 25 designate removable compressible clamping rings of rubber, neoprene, or other suitable resilient compressible material that can be easily located in or removed from the space afforded between the clamping rings and the central housing, as illustrated in Fig. 2.

The compressible rings 25 are arranged as illustrated at the right hand end of Fig. 2, and thereupon after inserting a pipe section and operating the cam plates by swinging the hand lever 18 upwardly from the dotted line position illustrated in Fig. 1 to the full line position there shown, the compressible ring 25 is compressed between the central housing and clamping ring against the pipe section 1, as illustrated at the left hand end of Fig. 2, and when in such position clamps the pipe section securely and holds it against accidental or unintentional release.

The shape of the cam slots in the cam plates is such that when they are moved to clamping position, the frictional engagement of the cam plates with the pins 15 and 16 acts to hold the clamping sleeves securely in clamping position and the pipe sections will not be released until the hand levers 18 are forcibly moved downwardly, thereupon actuating the clamping rings away from the central housing and releasing pressure on the compressible rings 25.

The coupling can then be removed endwise from the pipe sections to permit cleaning and sterilizing the coupling and pipe sections, and for this purpose, the compressible rings 25 can be removed from the coupling so that the water, steam, or other sterilizing liquid has access to every part of the coupling. After sterilizing, the compressible rings can be reinserted into their positions between the clamping sleeves and the central housing and the parts are again ready to be clamped onto the pipe sections.

While the invention has been described in connection with the particular construction shown, it is not confined to such detailed arrangement, and this application is intended to cover any changes or modifications that may come within the purposes of the invention and the scope of the following claims.

I claim:

1. A quickly detachable pipe coupling comprising a central housing constructed to receive the ends of two pipe sections and removable therefrom, guide rods mounted on the housing exteriorly thereof on opposite sides, clamping sleeves movably supported on said guide rods at opposite ends thereof in spaced relation to the ends of the housing, compressible gripping elements removably located between the ends of the central housing and said clamping sleeves, and independent operating instrumentalities supported on the central housing on opposite sides thereof and operatively engageable with the clamping sleeves to move them to and from clamping position.

2. A quickly detachable pipe coupling comprising a central housing constructed to receive the ends of two pipe sections, clamping sleeves movably arranged in spaced relation to the ends of the housing, the adjacent faces of said clamping sleeves and housing having inwardly inclined surfaces, compressible gripping rings removably located between the ends of the housing and the clamping sleeves and abutting the aforementioned inclined surfaces, supporting and guiding means for the clamping sleeves mounted on the housing, operating instrumentalities for each clamping sleeve comprising a pair of rigidly connected parallel cam plates pivotally supported on opposite sides of the housing and having cam slots therein, means carried by the clamping sleeve engaging said cam slots, and hand operated means connected to said cam plates.

3. A quickly detachable pipe coupling comprising a central housing constructed to receive the ends of two pipe sections, clamping sleeves movably arranged in spaced relation to the ends of the housing, the adjacent faces of the housing and clamping sleeves having inwardly inclined surfaces, circular compressible gripping rings removably located between the ends of the housing and said clamping sleeves and abutting said inwardly inclined surfaces, the housing having pairs of oppositely extending trunnions adjacent its ends, operating instrumentalities for each clamping sleeve consisting of rigidly connnected oppositely arranged parallel cam plates pivoted on said trunnions of the housing and having cam slots therein, oppositely extending pins mounted on the clamping sleeve and engaging said cam slots, a hand operated portion connected to said cam plates, and guide rods oppositely arranged on the housing and extending through openings in said trunnions of the housing, the pins of the clamping sleeves having openings therein which receive the ends of said guide rods and the clamping sleeves being movable on the guide rods endwise toward and from the housing.

4. A quickly detachable pipe coupling comprising a central housing constructed to receive the ends of two pipe sections and removable therefrom, guide rods mounted on the housing exteriorly thereof on opposite sides, clamping sleeves movably supported on said guide rods at opposite ends thereof in spaced relation to the ends of the housing, compressible gripping elements removably located between the ends of the central housing and said clamping sleeves, and cam operating instrumentalities supported on the housing on opposite sides and operatively engageable with the clamping sleeves to move them to and from clamping position.

5. A quickly detachable pipe coupling comprising a central housing constructed to receive the ends of two pipe sections, clamping sleeves movably arranged in spaced relation to the ends of the housing and supported by the housing, compressible gripping elements removably located between the ends of the central housing and the clamping sleeves, cam operated instrumentalities for the clamping sleeves mounted on the housing, and guide rods fixedly mounted on the housing and engaging the clamping sleeves which are slidable on the guide rods.

ARTHUR S. HAMILTON, Jr.

REFERENCES CITED

The following references are of record in the file of this patent:

UNITED STATES PATENTS

| Number | Name | Date |
| --- | --- | --- |
| 736,057 | Beatty | Aug. 11, 1903 |
| 1,821,952 | Werner | Apr. 8, 1931 |
| 2,076,876 | Boughton | Apr. 13, 1937 |
| 2,133,558 | Miller | Oct. 18, 1938 |

FOREIGN PATENTS

| Number | Country | Date |
| --- | --- | --- |
| 188,893 | Germany | Sept. 20, 1907 |